United States Patent [19]

Brandt et al.

[11] Patent Number: 4,496,958

[45] Date of Patent: Jan. 29, 1985

[54] DRAWING PEN EXCHANGER FOR COMPUTER CONTROLLED DRAWING MACHINES

[75] Inventors: Joachim Brandt, Hamburg; Gerhard Deblitz, Quickborn; Jürgen Post, Stelle; Bernd Willimczik, Wedel; Rolf Marten, Hamburg; Rolf Paschen, Elmshorn; Gerold Anderka, Ellerbek, all of Fed. Rep. of Germany

[73] Assignee: Koh-I-Noor Rapidograph, Inc., Bloomsbury, N.J.

[21] Appl. No.: 442,064

[22] Filed: Nov. 16, 1982

[30] Foreign Application Priority Data

Nov. 19, 1981 [DE] Fed. Rep. of Germany ....... 3145904

[51] Int. Cl.[3] ............................................ G01D 15/00

[52] U.S. Cl. ................................ 346/139 R; 33/18 R

[58] Field of Search ........................ 346/139 R, 29, 46; 33/18 R; 364/520

[56] References Cited

U.S. PATENT DOCUMENTS

| | | | |
|---|---|---|---|
| 2,717,820 | 9/1955 | Bowditch | 346/140 |
| 3,880,294 | 4/1975 | Arseneault | 214/1 B |
| 4,135,245 | 1/1979 | Kemplin | 346/139 R X |
| 4,288,798 | 9/1981 | Hollmayer | 346/139 R |
| 4,401,996 | 8/1983 | Shirahata | 346/139 R |
| 4,417,258 | 11/1983 | Tribolet | 346/139 R |

*Primary Examiner*—Joseph W. Hartary

*Attorney, Agent, or Firm*—David H. Semmes; Warren E. Olsen

[57] ABSTRACT

A drawing pen exchanging device for transferring a drawing pen between a drawing head (4) and a drawing pen magazine (5) in a computer controlled drawing device. The drawing pen (7) is held against a stationary holding area in the drawing head (4) with the aid of a spring holding element (14) and against a stationary receptacle area (11, 12) in the drawing pen magazine (5) by means of a spring-pressure element (24). Through a sliding cooperation with a guide (25) provided to the side of the stationary holding area (21,22), the holding element (14) is swung out to transfer the drawing pen (7) from the drawing head (4) into the drawing pen magazine (5) and the drawing pen (7) then will be held back by the pressure element (24) in the drawing pen magazine (5). When the drawing pen (7) thereafter is to be removed from the drawing pen magazine (5) the holding element (14) is operable not to engage the guide (25) and thereby will pull the drawing pen (7) from the drawing pen magazine (5) (FIG. 2).

6 Claims, 8 Drawing Figures

DRAWING PEN EXCHANGER FOR COMPUTER CONTROLLED DRAWING MACHINES

BACKGROUND OF THE INVENTION

1. Field of the Invention

The invention relates to a drawing pen exchanging device, for computer controlled drawing machines, wherein at least one spring holding element holds the drawing pen in a receptacle in the drawing head, along with at least one stationary drawing pen magazine. The drawing pen is held with the aid of at least one spring-pressure element such that the drawing pen can be exchanged by engaging the receptacle and the drawing pen magazine between said receptacle and magazine in a straight line movement, essentially perpendicular to the longitudinal axis of the drawing pen.

2. Brief Description of the Prior Art

In the case of a known drawing pen exchanging device of this type (DE-OS 29 13 690, U.S. Pat. No. 4,288,708) the drawing pen is held in the receptacle of the drawing head by two opposing leaf springs, whose ends reach around the drawing pen slightly and press it against a stationary surface of the receptacle opposite the delivery opening. Moreover, the free ends of the leaf springs extend slightly ahead in the direction of transfer of the drawing pens to the drawing pen magazine. Two correspondingly formed springs are located in the drawing pen magazine.

When the pen is held in the drawing pen magazine and the drawing head draws near the drawing pen magazine, the free ends of the drawing head springs are located at less distance from one another (due to the fact that one drawing pen is missing), than the ends of the drawing pen magazine springs which are forced apart by the inserted drawing pen. Thusly, bringing the free ends of the drawing head springs in contact with the outer surface of the drawing pen forces them apart, as the drawing head continues to approach the drawing pen magazine. In this condition, they touch the protruding ends of the springs of the drawing pen magazine and push themselves between these springs and the drawing pen until their free ends surround the drawing pen and draw it out of the drawing pen magazine as the movement of the drawing head is reversed.

When a drawing pen is placed from the drawing head into the drawing pen magazine, the springs function in the same manner as described above, however, in this case the springs of the drawing pen magazine push themselves between the drawing head springs and the drawing pen.

Although this prior art drawing pen exchanging device operates relatively simply and also reliably, it has the disadvantage that the position of the drawing pen in the drawing head is not exactly defined, since it essentially is determined by characteristics of the two springs which can change during use. Thus, it can occur that when a drawing pen with a given line width is exchanged for a drawing pen with another line width and an attempt then is made to continue the line drawn by the first drawing pen with this new drawing pen, the newly drawn line width does not line up exactly with the existing line segment.

In the case of another known drawing pen exchanging device (DE-OS 27 55 586, U.S. Pat. No. 4,135,245) the drawing head has a retaining clamp which operates by spring force and with which the drawing pen is held to the drawing head. However, in order to transfer the drawing pen from the drawing head into a drawing pen magazine, the drawing head must first move in a straight line to the drawing pen magazine and thereby move the drawing pen into the area of the magazine. Thereupon, there is a vertical movement which transports the drawing pen within the area of the magazine into its repository and releases it from the drawing head. Then the drawing head is moved in a straight line movement parallel to the aforesaid straight line movement out of the area of the drawing pen magazine. Thus, with this second prior art drawing pen exchange assembly there necessarily is a relatively complicated movement to transport a drawing pen from the drawing head into the drawing pen magazine and vice versa.

The object of the invention is to create a drawing pen exchanging device for computer controlled drawing devices which makes it possible to exchange a drawing pen between the drawing head and the drawing pen magazine through a simple straight-line movement, whereby the drawing pen is held in a defined position in the drawing head.

BRIEF SUMMARY OF THE INVENTION

This object is achieved by a drawing pen exchanging device, of the type mentioned hereinbefore, constructed according to the invention, wherein the spring-holding element presses a drawing pen located in the receptacle against a stationary receptacle area, which in turn partially surrounds the drawing pen. The spring pressure element presses a drawing pen located in the drawing pen magazine against a stationary holding area, wherein further an elastically deformable guide is provided at the side of the drawing pen magazine or upon that receptacle, which guide having a guide surface which extends, from its free end, obliquely out from the holding area or receptacle area, respectively. By moving along the guide surface, the holding element holding the drawing pen, or the pressure element holding the drawing pen, respectively, are operable to be swung away. Between the guide surface and the drawing pen, the holding element (in the case where the drawing head bearing no drawing no drawing pen approaches or, respectively, the pressure element in the case were the drawing head bearing a drawing pen approaches), is brought into engagement with the drawing pen. Thereby, the guide is swung to the outside due to an engagement, at least in the outer distal area, of the holding element or the respective pressure element when the drawing head and the drawing pen magazine separate.

With a drawing pen exchanging device according to the present invention, the drawing pen is pushed into a defined position both in the drawing head receptacle and into the drawing pen magazine, since the pen comes to rest at a stationary receptacle area or, respectively, at a stationary holding area. Thus, particularly when a drawing pen in the drawing head is exchanged, there will be no drawing irregularities due to a change in the relative drawing pen position.

The guide taught herein is configured so as to enable such a drawing pen exchanging device to execute a pen exchange with straight-line movements. This guide is disposed on the side of the drawing pen magazine. The holding element is adapted to be swung out from the guide, when there is a drawing pen in the drawing head and when the holding element moves into the area of this guide. Thus, the holding element, and thereby the drawing head, is operable to release a drawing pen held within the drawing pen magazine by a spring-pressure element, e.g. a leaf spring whose free end area is bent slightly to the outside. In order to remove the drawing pen from the drawing pen magazine, the drawing head is moved proximate to the stationary drawing pen magazine. Since the holding element normally is urged, by spring force, to be inside that area in which a drawing pen may be located upon the drawing head, the holding element then is moved between the guide and the drawing pen, which is being held in an associated drawing magazine. The holding element thereby presses, due to its spring construction, against the drawing pen and surrounds the pen to a certain extent. When the drawing head then is moved back, the drawing pen is taken along, due to its engagement with the holding element. Of course, the resulting grasping force of the holding element then is somewhat greater than the retaining resistance exerted upon the drawing pen by the pressure element in the drawing pen magazine.

Alternatively, it is possible to attach the guide on the drawing head and then to construct the drawing pen magazine so that it operates in the manner described above, in connection with a holding element drawing head.

In the context of a drawing pen exchange device whose guide is attached to the drawing pen magazine, it is preferred that the holding element have a pin which extends below into the area of the guide, thereby, the guiding and swinging-away function of this pin is taken over and takes place outside that area in which the holding element and the drawing pen engage. The holding element can consist of a member which pivots under spring force.

It is preferable that the holding element and the pressure element be located on opposite sides of the linear movement path used for transferring the drawing pen. In this manner, the holding element and the pressure element can be arranged at a constant height relative to the drawing pen, thereby keeping the total height of the drawing pen exchanging device low.

A particularly simple arrangement results when the holding element and the pressure element each are located between two vertically spaced, U-shaped receptacle holders in the drawing head and the drawing pen magazine, respectively. If this is the case the receptacle holders of the drawing head lie at a different level relative to the longitudinal axis of the drawing pen being held than the receptacle holders of the drawing pen magazine. With such an arrangement, it becomes possible to move the drawing head and the drawing pen magazine so close together that the U-shaped holders of the two will surround the drawing pen. Hence, a drawing pen then will be transferred under the influence of the above described operation of the holding element and the pressure element, without any further relative movement, at the moment of separation or transfer.

Further objects and features of the present invention now will be described in greater detail, with reference to a preferred embodiment and the accompanying drawings.

DESCRIPTION OF THE PREFERRED EMBDOIMENT

Figure 1:
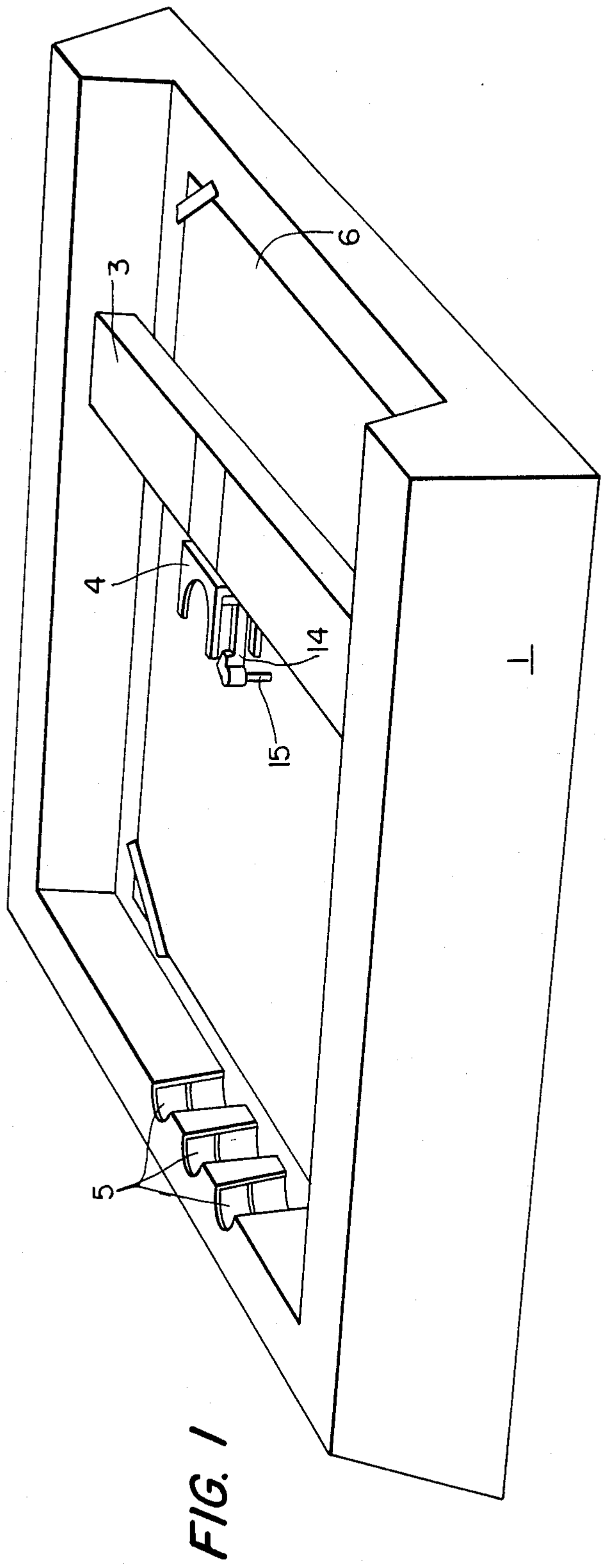
FIG. 1 shows a simplified, perspective representation of a plotter with a drawing pen exchange device according to the present invention.

The table plotter 1 shown in FIG. 1 has a beam 3 which moves back and forth in one direction over the drawing surface 6. A schematically represented and greatly simplified drawing head 4 is shown attached for movement back and forth on the beam 3, in the longitudinal direction of the beam 3. In addition, a greatly simplified and schematically represented drawing pen magazine 5 are shown on the stationary frame of the plotter 1.

Figure 2:
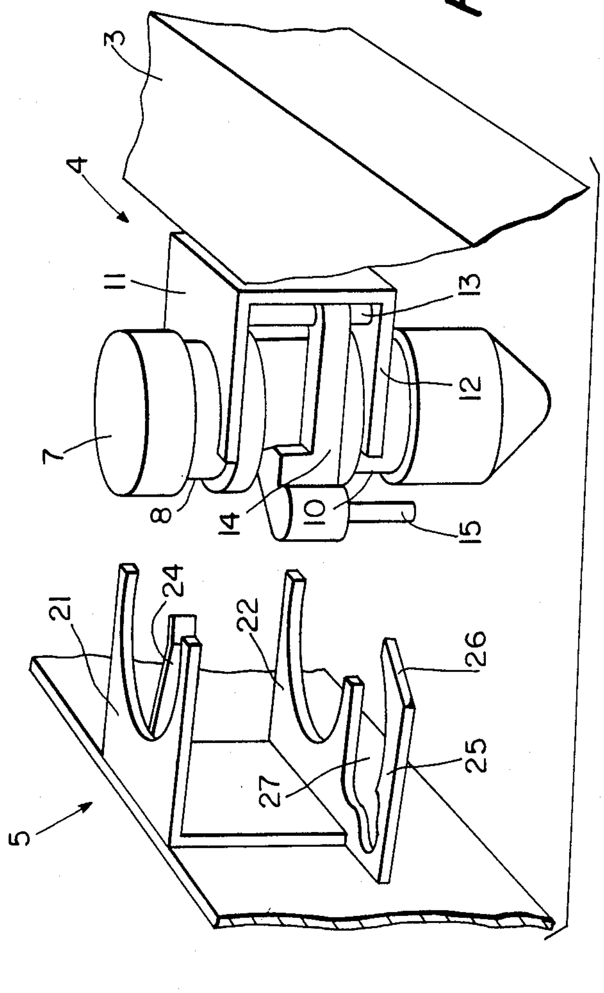
FIG. 2 shows, by a simplified frontal perspective representation, the receptacle of the drawing head with a drawing pen and the drawing pen magazine located at a distance from the drawing head.
Figure 3:
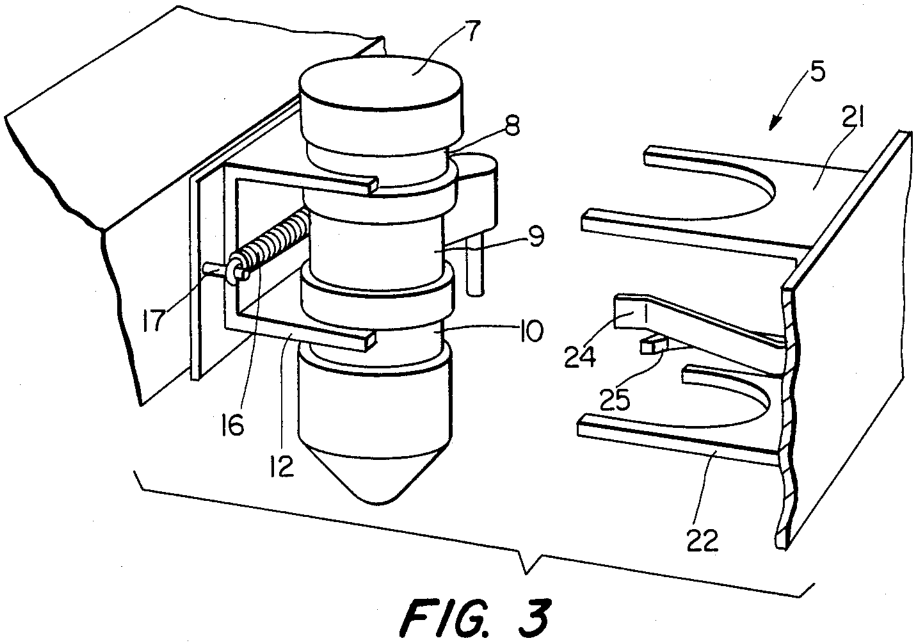
FIG. 3 is a rear perspective view of the structure of FIG. 2.

In the frontal view of FIG. 2, and in the rear view of FIG. 3, a drawing pen magazine 5 is depicted on the left and right sides, respectively. The drawing pen magazine 5 comprises at least one stationary receptacle, which further comprises an upper receptacle holder 21 with a U-shaped cutout and a correspondingly formed lower receptacle holder 22. Between these two receptacle holders there is a leaf spring 24 which serves as a pressure element. Its outer free end is bent slightly to the outside, i.e., away from the U-shaped cutouts. In its unstressed condition this free end extends into the area between the U-shaped cutouts of the receptacle holders 21 and 22. On the side of the receptacle, opposite the leaf spring 24, there is provided a guide 25 in the form of a brace, adjacent to the lower receptacle holder 22. A cutout 27 is located between the guide 25 and the receptacle holder 22. The guide 25, further comprises a guide surface 26 at its outer free end, which surface extending out from the guide free end at an angle in the direction of the receptacle holder, i.e., obliquely to the outside.

The receptacle upon the schematically represented, simplified drawing head 4 also comprises an upper receptacle holder 11, with a U-shaped cutout, and a lower receptacle holder 12 with a U-shaped cutout. A hinge pin 13 is attached between the two receptacle holders and on the same side and opposite the guide 25 on the associated stationary receptacle. A lever 14 forms a holding element and pivotingly is attached to the hinge pin 13. The lever 14 extends outwardly, from the hinge pin to a downwardly extending pin, 15, which is proximate the free ends of the receptacle holders 11, 12. At the inner end of the lever 14, one end of a spring 16 is attached, with the other end attached to a retainer pin 17, whereby the spring will exert a tensile force upon the lever 14, thereby urging the free outer end 15 of the lever 14 to be swung inside and within the area between the U-shaped cutouts of upper and lower receptacle holders 12, 12.

Figure 6:
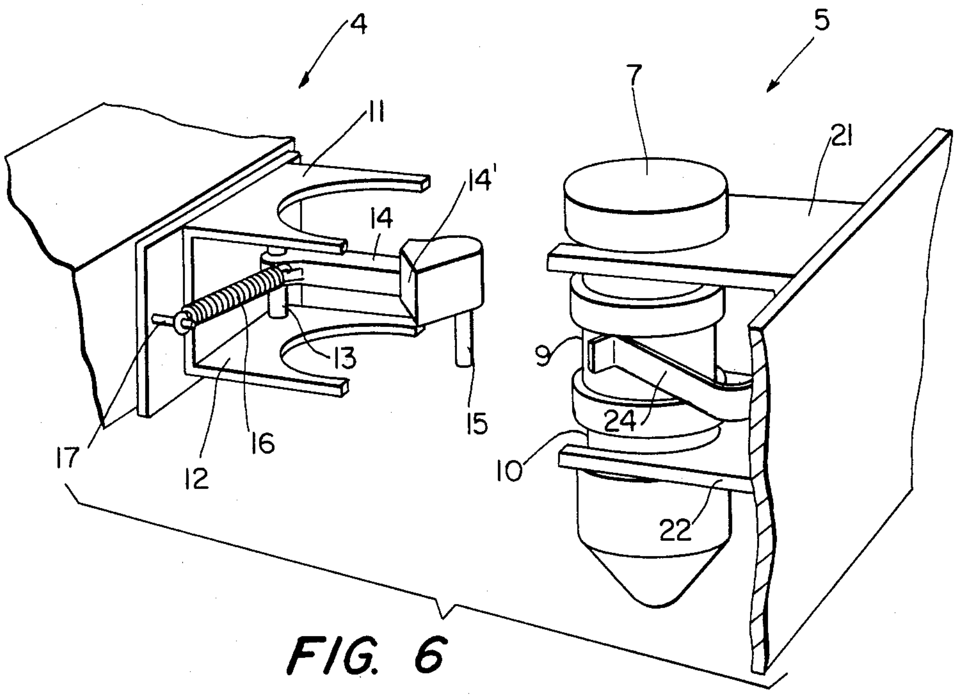
FIG. 6 is a rear view of the receptacle of the drawing head and the drawing pen magazine with a drawing pen in position.

In the embodiments of FIGS. 2 and 3, a drawing pen 7 is held in the receptacle of the drawing head 4. The pen connection can also be through a specialized receiver sleeve, into which a drawing pen can be inserted. The preferred drawing pen 7 has three spaced annular grooves 8, 9, 10. The outer end of the lever 14 is adapted to engage the middle groove 9 and push the drawing pen 7 through its contact surface 14' (as shown in FIG. 6), thereby surrounding somewhat this pen and urging it inward into the U-shaped cutouts of the receptacle holders 11, 12. This contact results in an exactly defined position of the drawing pen, due to the shape of the cutouts. The drawing pen 7 is supported vertically by the lower receptacle holder 12, upon which the drawing pen rests through the upper annular shoulder which defines the lower annular groove 10.

Figure 4:
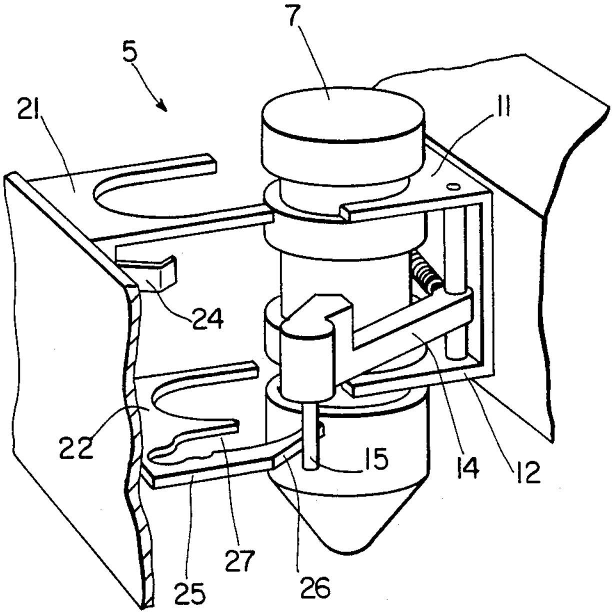
FIG. 4 is a perspective view of a drawing head containing the drawing pen, in a position close to the drawing pen magazine and just before transfer of the drawing pen.

If the drawing pen 7 is to be moved out of the drawing head into the drawing pen magazine 5, the drawing head first is brought into an alignment position in relation to the drawing pen magazine by means of a corresponding movement longitudinally along the beam 3. Then, the drawing head is brought up to the drawing pen magazine by moving the beam 3 transversely as shown in FIG. 4. During this approach a downwardly extending pin 15, which is part of the lever 14 touching the drawing pen 7 as shown in FIG. 4, will successively come into contact with the guide surface 26 and the guide 25 and slide along the latter. Due to the angle of the guide surface 26, the lever 14 is swung to the outside and out of engagement with the drawing pen 7. As the upper and lower receptacle holders 11, 12 of the drawing head move between the upper and lower receptacle holder 21, 22 of the drawing pen magazine, the drawing pen is urged within the U-shaped cutouts of the receptacle holders 21, 22. The pen thereby moves the spring 24, which is at the same level as the lever 14, to the outside and consequently the spring engages with the base of the drawing pen middle annular groove 9.

Figure 5:
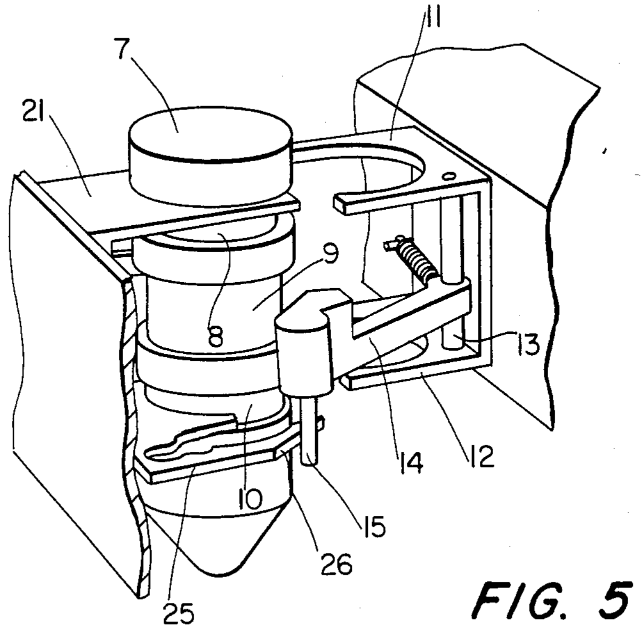
FIG. 5 shows the drawing pen magazine and the drawing head in a perspective view corresponding to FIG. 4 after the transfer of the drawing pen into the drawing pen magazine and after the drawing head has pulled slightly away.

As the drawing head retracts (FIG. 5) the spring 24 holds the drawing pen 7 securely in the receptacle holders 12, 22 while the lever 14, which had been swung to the outside by the guide 25, is maintained out of engagement with the drawing pen 7, i.e., the lever 14 does not pull the drawing pen magazine. In this position, the upper receptacle holder 21 secures the drawing pen 7 against vertical displacement by supporting the upper annular shoulder, which defines the upper annular groove 8.

The position which results after the return of the drawing head 4 which no longer contains the drawing pen 7, is shown in FIG. 6, with the drawing head and the drawing pen magazine shown as in a rear perspective view.

Figure 7:
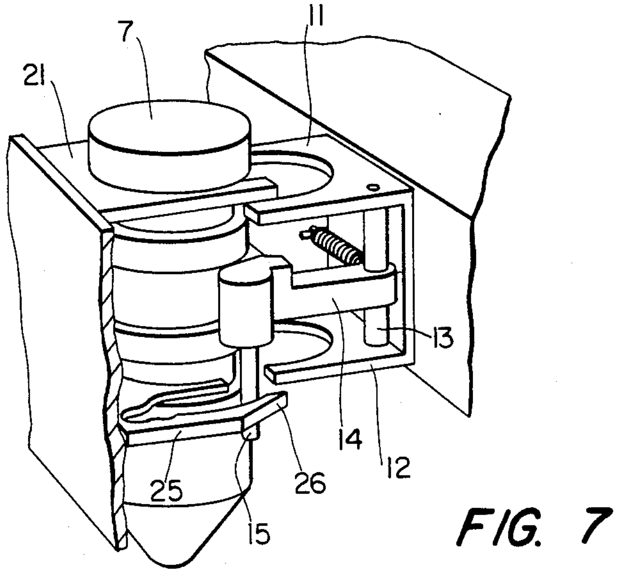
FIG. 7 shows a drawing pen magazine containing a drawing pen and a drawing head in a position close to the drawing pen magazine and operable then to remove the drawing pen from the drawing pen magazine.

If it then is desired that the drawing head remove the drawing pen 7 from the drawing pen magazine, the drawing head simply is brought again towards the drawing pen magazine, as shown in FIG. 7. Since now there is no pen in the receptacle holders 11, 12 of the drawing head, the lever 14 pivotally is urged further inside and into the area of the U-shaped cutouts of the receptacle holders 11, 12 by the force of the spring 16, than would have been the case if a drawing pen been held in the drawing head. For such a relative position of the lever 14, the downwardly extending pin 15 of the lever 14 is urged, as shown in FIG. 7, into a cutout 27 located between the guide 25 and the lower receptacle holder 22 of the drawing head 15. As a result, a contact surface 14' of the lever 14 (FIG. 6) comes into a sliding contact with the base of the annular groove 9 of the drawing pen 7 as the drawing head continues its linear approach and grasps the drawing pen in the manner already explained.

If, then, the drawing head linearly is retracted again (FIG. 8), the drawing pen 7 will be taken along, because the holding force of the spring 24 is overcome by the contact between the lever 14 and the drawing pen during such a retracting movement. Thus, the drawing pen 7 is pulled out of the drawing pen magazine. During the retracting movement the pin 15 also moves at least the outer part of the guide 25 somewhat to the outside. This is because, as a result of the contact with the drawing pen, the pin 15 is in a position swung far to the outside, hence, as the drawing head approaches the drawing pen magazine the pen comes into contact with the guide surface 26 of the guide 25 (compare FIGS. 8 and 4). For this reason, the entire guide 25 or at least the portion comprising the guide surface 26 is constructed elastically, e.g., by constructing the guide surface 26 as a leaf spring (not shown) which is attached to the rest of the guide 25.

Figure 8:
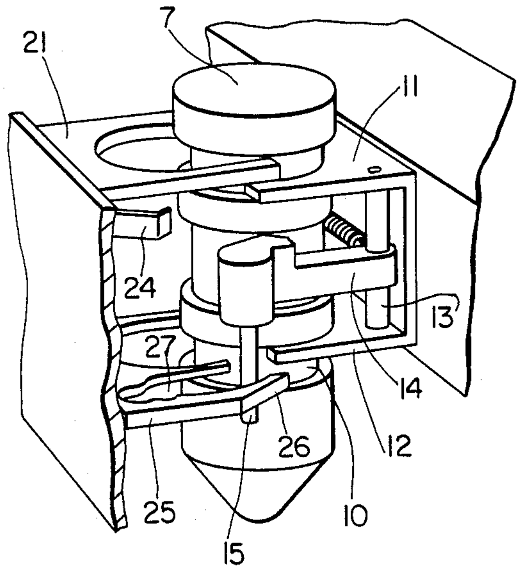
FIG. 8 shows a drawing pen and the drawing head after transfer of the drawing pen to the drawing head and subsequent to the position shown in FIG. 7.

After the drawing head has moved from the drawing pen magazine through the position in FIG. 8, the position shown in FIGS. 2 and 3 is attained once more.

Having now described a preferred embodiment, it is to be understood the invention is to be defined by the scope of the appended claims.

We claim:

1. In a drawing pen exchanging device of the type wherein a first holding element is adapted vertically to hold a drawing pen in a first receptacle which is part of a movable drawing head and a second pressure element is adapted vertically to hold a drawing pen in a second receptacle which comprises a guide and is part of a stationary pen holder on a drawing pen magazine, the improvement wherein the first holding element (14) yieldably urges a pen located in said first receptacle (7) against a stationary receiving zone (11, 12) and further comprises a pin (15) which extends vertically and below said stationary receiving zone and is operable to engage with a horizontally disposed surface of said guide (25) as the drawing head is moved along a linear movement path, substantially perpendicular to the longitudinal axis of a drawing pen held in either receptacle and proximate to the magazine.

2. A drawing pen exchanging device according to claims 1 or 2, wherein the holding element consists of a member (14) which is pivotal outwardly against a spring force.

3. A drawing pen exchanging device according to claims 1 or 2, wherein the pressure element further comprises a leaf spring (24) with a distal end bent outwardly, away from said receptacle area.

4. A drawing pen exchanging device according to claims 1, 2, wherein a holding element (14) and a pressure element (24) are provided on opposite sides of the linear movement path for transferring the drawing pen (7).

5. A drawing pen exchanging device according to claims 1, 2, wherein the holding element (14) and the pressure element (24) each are arranged between two U-shaped receptacle holders (11, 12; 21, 22) respectively on the drawing head (4) and the drawing pen magazine, said holders being vertically spaced one from another, wherein further the receptacle holders (11, 12) of the drawing head (4) lie at a different level, relative to the longitudinal axis of a drawing pen (7), held therein, than the receptacle holders (21, 22) of the drawing pen magazine (5).

6. A drawing pen exchanging device for computer controlled drawing devices having at least one first yielding holder element adapted to hold a drawing pen in a first receptacle of a drawing head, as well as at least one second receptacle in a stationary drawing pen magazine, in which the pen will be held with the aid of at least one second yielding pressure element, the drawing pen being replaceable therebetween by an engagement of the receptacles which substantially is perpendicular to the longitudinal axis of the pen between them, characterized in that the first yielding holder element (14) provided in the first receptacle presses a pen (7) located in that receptacle against a stationary receiving zone (11, 12) partially surrounding the stylus (7) and the second yielding pressure element (24) provided in the second receptacle presses the stylus (7) located in the second receptacle against a stationary holding zone (21, 22), wherein, further, an elastic, deformable guide (25) is provided laterally on the second receptacle, the guide comprising a guide face (26) extending from its free end obliquely away from the holding zone (21, 22) or from the receiving zone, (11, 12), wherein, upon an approach of the first receptacle towards the second receptacle, the first yielding holder element (14), when holding a pen (7) will be pivoted away from the pen (7), by said guide face (26), while the first yielding holder element (14), when not holding a pen, will be moved to between this guide face and the pen (7) and then brought into engagement with the stylus (7), whereupon a guide (25) also is pivoted outward, at least in the outer end zone, by engagement with the first yielding holder element upon said approach of the first receptacle, when not holding any pen and as it is brought into engagement with the stylus (7), and said guide (25) is pivoted outward, at least in the outer end zone, upon the separation of the receptacles by means of an engagement between the guide (25) and the first holder element (14).

* * * * *